UNITED STATES PATENT OFFICE.

EDGAR ARTHUR ASHCROFT, OF LONDON, ENGLAND.

MANUFACTURE OR PRODUCTION OF ANHYDROUS METAL CHLORIDS.

1,232,169.      Specification of Letters Patent.      Patented July 3, 1917.

No Drawing.      Application filed December 5, 1916. Serial No. 135,242.

*To all whom it may concern:*

Be it known that I, EDGAR ARTHUR ASHCROFT, a subject of the King of Great Britain, residing at 65 London Wall, in the city of London, England, and Plumley, Bovey Tracey, in the county of Devon, England, have invented new and useful Improvements in the Manufacture or Production of Anhydrous Metal Chlorids, of which the following is a specification.

My invention relates to processes for the manufacture, or production, of anhydrous metal chlorids, or mixtures of anhydrous metal chlorids, from magnesium oxid, or carbonate, or from other metal compound, or compounds, such processes being such as those which form the subject matter of my application for Letters Patent No. 12,873 A. D. 1916, in which dry chlorin gas is passed into a vessel (which I will call the converter) containing a fused medium in which is suspended, mixed, or dissolved, the compound, or compounds, to be treated for the obtainment of the required anhydrous metal chlorid, or chlorids, there being preferably used in conjunction with the metal chlorid, or mixture of such chlorids, another substance (such for example as galena or zinc blende, or carbon, whereby double decomposition and reactions, of a more, or less, strongly exothermic character, are brought about. The converter employed for the purpose of my invention may conveniently consist of an outer casing of iron with a lining, or bosh, of hard burned magnesite bricks and blocks carefully fitted and joined by magnesia cement mortar, and the interior may be conical with the smallest dimension at bottom the inlet for chlorin gas being suitably protected and led to this lower part. A tapping hole and spout for the fused chlorid is provided at a short distance above the bottom, so that, when the converter is tapped it is not completely emptied but retains a small portion of the hot charge to constitute the fused medium, for starting the next operation.

The normal temperature of working will generally be between 700° and 900° centigrade and the sum of all the reactions being exothermic. The temperature can be regulated by the rate at which the chlorin gas and the raw material, or materials, are supplied. The volatile products may pass away through a vent to a condenser, or they may be otherwise disposed of, or treated in any desired way, all as stated in the specification of my aforesaid application for Letters Patent.

I have now found that the aforesaid reactions, and more especially the discharge of all the oxygen from the magnesium oxid and its replacement by chlorin can be caused to proceed quantitatively and rapidly even without employing excess of chlorin if a small quantity of a substance which acts as a chlorin carrier (or which may be described as a catalytic agent suitable for these reactions) be added to the melt in the converter during the operation. I have found iron compounds, and manganese, or manganese compounds, in finely divided form, to be especially effective for this purpose. I may employ other analogous catalytic substances, or carriers of chlorin; for instance, ferro-manganese, ferro-tungsten, ferro-chrome, or the like, or iron oxid, or chromium salts, and numerous other analogous substances may be employed. To illustrate more particularly the advantages of a catalyzer, or chlorin carrier, I give the following particulars of experiments which I have made, the first being in accordance with my aforesaid application for Patent No. 12,873 A. D. 1916 and the second being in accordance with my present invention.

*Experiment No. 1.*

A little sodium chlorid and postassium chlorid were mixed and melted together in a plumbago crucible (representing the converter) capable of holding, when full, say about 800 grams of fused magnesium chlorid. The crucible was provided with a hood to exclude air and with an escape pipe for gaseous products. Chlorin was blown in through a small pipe leading to the bottom of the crucible and, with the melt at a temperature of about 700° to 900° centigrade, a mixture of $2MgO+C$ was fed in slowly and regularly at short intervals.

Reaction took place slowly and after one hour of the chlorin treatment with considerable excess passing through and escaping, (about 200 liters of chlorin having been passed in) only about one third of the MgO fed in was converted and the melt thickened. After similar treatment for another hour the melt thinned a little and analysis showed that about one half of the MgO had been converted. To effect complete conversion required a long treatment at a rather high temperature and a large excess of chlorin.

*Experiment No. 2.*

The experiment was commenced exactly as in the preceding Experiment No. 1, but a little iron sulfid was added (about 5 per cent. of the total charge of the full crucible) when the chlorin passing was immediately absorbed and continued to be absorbed even when the flow was increased to 300, or even 600, liters per hour. The temperature rose rapidly and it was demonstrated that it was practicable to feed in and convert the whole charge in from half an hour to one hour and a half according to the flow of chlorin.

During the conversion in this manner $CO_2$ gas alone escapes (after the small quantity of sulfur, or of oxygen, has been discharged from the small quantity of iron compound added) and as soon as no unchanged MgO remains suspended or dissolved, in the melt this is indicated by an instantaneous and copious evolution of brown fumes (vaporized ferric chlorid). The supply of chlorin is then stopped and, if it be desired to have the $MgCl_2$ completely free from iron, a very small quantity of fresh MgO should be added to precipitate any ferric iron which has been dissolved as chlorid by excess of chlorin. After, or before, pouring the contents of the converter, the ferric oxid is allowed to settle and may be used for a subsequent charge instead of using fresh pyrites.

In some cases, for instance when the melt contains much lead chlorid and has therefore a higher specific gravity rendering the settlement of iron oxid less easy, I may remove the iron from the melt (if the product be required free from iron) while the iron salt is still in the ferrous state by stirring in, in a separate vessel to which the melt is removed and while the temperature of the melt is still high, (say from 700° to 900° centigrade), sufficient finely divided lead which, at the temperature stated, will precipitate the iron from ferrous chlorid present and form a heavy iron-lead alloy and lead chlorid. The lead chlorid, of course, remains with the melt and the alloy sinks to the bottom and may be easily recovered. If silver, gold, or copper, from the pyrites, or sulfids, employed, be present in the melt the whole of these metals will be found with the iron-lead allow and, together with the lead of the alloy, can be very readily recovered by methods known for similar operations.

When iron or manganese sulfids, or other compounds forming higher and lower oxids and chlorids are employed as chlorin carriers, or catalyzers, I have found it most convenient to eliminate the carrier, or catalyzer, from the finished chlorid (for example magnesium chlorid) by evaporation of the higher chlorids, and carbon can be completely removed from such melts by a small current of dry air, or oxygen gas. The operations may be carried on simultaneously and while the melt is still hot and without removing it from the converter. Or these operations may be conducted in a separate vessel after "pouring" the melt.

As an example, I give the following to which however I do not limit myself: Magnesium oxid is first intimately mixed with carbon in about the aforesaid proportion with the requisite quantity (5 to 10 per cent.) of finely pulverized iron pyrites and the conversion into chlorid is carried out as hereinbefore described until the appearance of brown fumes of vaporized ferric chlorid indicates that all oxygen and sulfur have been replaced by chlorin. A smaller flow of chlorin is now continued until all the ferrous chlorid has been converted to ferric chlorid which being volatile at a very low temperature (100° centigrade) freely leaves the melt as a fume which condenses again in the flues, or in a chamber provided for the purpose. This fume, which constitutes say from 5 to 10 per cent. of the whole charge, is conveniently mixed with the full charge of magnesium oxid for the next converter batch, and say one per cent. of fresh pyrites is added thereto and intimately mixed.

After this final operation it may be convenient also to introduce dried air, or oxygen, gas through the chlorin inlet pipe or through another pipe. This burns any residual carbon, peroxidizes any ferrous oxid present, assists in separating the ferric chlorid from the melt, and aids in maintaining the heat of the converter. It also leaves a clean white finished product.

In like manner the burning of carbon by air, or oxygen, may be employed at any stage of the process to maintain the heating effect, or to raise the temperature of the converter. For instance if, at starting, the requisite temperature for rapid reaction, which is between 800° and 900° centigrade, has not been attained a charge of crushed and dried charcoal may be introduced and burned out with air, or oxygen, when the desired rise of temperature will be obtained, but the supply of oxygen must not be continued after the carbon is all consumed nor introduced to the converter in the absence of free carbon otherwise decomposition of $MgCl_2$ may result. When the air, or oxygen, is shut off the chloridizing process is continued. A little dry air, or oxygen, may be again introduced during the final operation of finishing the charge as hereinbefore described. The chlorin should be shut off at all times while oxygen or air is being admitted.

The further treatment of the melt, free from iron, for the separation of lead, zinc, and magnesium, chlorids, if present together, and the recovery of their combined chlorin may also be carried out in ways known for similar operations.

The reactions which come into play in the process according to my present invention may be stated as follows, viz:—

Principal reaction:

(1) $2MgO+C+2Cl_2=2MgCl_2+CO_2$

Simultaneous reaction:

(2) $2FeS_2+3Cl_2=Fe_2Cl_6+4S$
(combined with O and Cl₂ from other reactions)

Catalytic reaction:

(3) $Fe_2Cl_6+3MgO=3MgCl_2+Fe_2O_3$

Catalytic reaction:

(4) $2Fe_2O_3+6Cl_2+3C=2Fe_2Cl_6+3CO_2$

Catalytic reaction:

(5) Repeat (3)

Catalytic reaction:

(6) Repeat (4)
(and so on *ad infinitum*).

With manganese and salts of other metals capable of acting as catalyzers, or chlorin carriers, the reactions are analogous. For instance with manganese in the presence of chlorin and magnesium oxid the reaction will be (1) Same as (1) above
(2) $MnS+Cl_2=MnCl_2+S$
(3) $MnCl_2+2MgO+Cl_2=MnO_2+2MgCl_2$
(4) $MnO_2+Cl_2+C=MnCl_2+CO_2$
(5) Repeat (3)
(6) Repeat (4)
(and so on *ad infinitum*).

If preferred the carbon may be omitted when oxygen alone will be disengaged by these reactions, but the exothermic quality of the process will be improved by the use of carbon.

If desired, for any purpose, alkali metal chlorids in any suitable proportion may be added to increase bulk and fluidity (thus aiding the settlement of solid matter) or to lower the melting point before electrolysis, or other treatment, or employment, of the product. The greatest fluidity is obtained when the three chlorids magnesium, potassium, and sodium, are present in molecular proportions whereby a very fluid melt of very low melting point is produced and such a melt is very convenient for subsequent treatment to recover the magnesium as metal.

When it is desired to produce a mixture of lead chlorid, or zinc chlorid with magnesium chlorid from sulfids of these metals and magnesium oxid as hereinbefore first described (such mixtures being very useful for the economical extraction of the several metals by fractional electrolysis, or by fractional precipitation, or by both) the same procedure as that hereinbefore described is followed, by introducing to the charge in the converter, a small quantity of the substance which acts as a catalyst, or a carrier, of chlorin. For instance, in the case of simultaneously chloridizing magnesium oxid in admixture with blende, or galena, or both, instead of employing clean blendes, or galenas, I may employ the articles of commerce known as lead, or zinc, concentrates, or mixtures of lead, or zinc, sulfids, or both, in various proportions with silver and other small impurities. Such concentrates will nearly always contain enough iron, or manganese (or both) to constitute a catalyzer or chlorin carrier for my purpose and it is not necessary to add such concentrates in any particular proportion but the proportion most convenient for the purposes of the market may be selected so that the same plant may make an output of any two, or more, metal chlorids (magnesium, zinc, lead, silver and the like) in any desired proportional quantities and thereby secure a maximum economy of working under any given conditions of demand for the products.

It will be obvious that zinc or lead fumes, residues, or the like, may also be worked up to chlorids in the converter by mixing them in ascertained suitable proportions with the aforesaid charges and all the metal content of such fumes, or residues, or the like, will be obtained as chlorids.

Instead of magnesium oxid as raw material for this process I may employ magnesium oxychlorid, for instance the product obtained by attempting in various ways to dehydrate magnesium chlorid which has been dissolved in water.

Or crude natural carnallite may be added to the contents of the converter and both the potassium chlorid and the magnesium content will be thereby usefully recovered. Any impurities remaining in the melt may be removed as hereinbefore described after the chloridizing is complete. Sulfates are also decomposed and sulfur eliminated in this treatment and the metals remain as chlorids.

Any water of hydration which remains with the aforesaid salts when added to the converter is removed and a corresponding amount of hydrochloric acid is formed and passes off and may be recovered. The remainder of the chlorin content of these chlorids remains as anhydrous metal chlorid in the melt and the employment thereof in lieu of magnesium oxid may effect a considerable economy in the total chlorin requisite.

The reactions of the water of hydration in the converter may be represented by a few typical examples:—

(1) $MgCl_2 + H_2O = MgO + 2HCl$
(2) $FeCl_2 + H_2O = FeO + 2HCl$
(3) $FeCl_6 + 3H_2O = Fe_2O_3 + 6HCl$ and so on.

In all cases the presence of water causes formation of oxid or oxychlorid, in the melt and an equivalent escape of chlorin as hydrochloric acid.

It is however to be noted that, in the presence of some sulfids and like minerals or of finely divided metals, such as fumes and the like, for instance zinc or lead fume, if added to the contents of the converter simultaneously with the water-bearing substance, the escaping hydrochloric acid gas will again combine with such metal substances and hydrogen alone, or in combination with sulfur, will be finally liberated.

It is also possible by this process to employ magnesium sulfate as raw material and recovery of both the magnesium and the sulfur oxid content will result. This reaction takes place with the assistance of catalyzing, or carrier, substances as aforesaid.

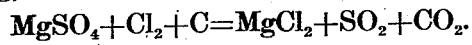
$$MgSO_4 + Cl_2 + C = MgCl_2 + SO_2 + CO_2.$$

My invention may be similarly applied to the manufacture or preparation of other anhydrous chlorids from corresponding salts or compounds, for instance, chromium chlorid or any chlorid which retains water of hydration or is decomposed on fusion.

In the following claims I wish it to be understood that in the expression "anhydrous metal chlorid" I include any hereinbefore named anhydrous metal chlorid or any mixture thereof and that by the expression "oxygen-containing metal compound" I mean magnesium oxid, or magnesium carbonate, or a hydrated chlorid, or oxychlorid, or other metal compound, or a mixture of such compounds hereinbefore mentioned as initial material and further that in the expression "chlorin carrier" I include iron, or manganese, or an alloy, or salt, of iron, or of manganese, or other substance which will act as a catalyzer, or chlorin carrier.

I claim as my invention:—

1. The manufacture of anhydrous metal chlorid, by treating, with chlorin gas, an oxygen-containing metal compound, in a fused medium in the presence of a substance which will act as a chlorin carrier, substantially as hereinbefore explained.

2. The manufacture of anhydrous metal chlorid, by treating, with chlorin gas, an oxygen-containing metal compound, in a fused medium together with carbon and a chlorin carrier, substantially as hereinbefore explained.

3. The manufacture of anhydrous metal chlorid, by treating, with chlorin gas, an oxygen-containing metal compound in a fused medium together with a substance which will promote the exothermic nature of the reaction and in the presence of a chlorin carrier, substantially as hereinbefore explained.

4. The manufacture of anhydrous metal chlorid, by treating, with chlorin gas, an oxygen-containing metal compound in a fused medium in the presence of a chlorin carrier, and subsequently eliminating the chlorin-carrying substance, substantially as hereinbefore explained.

5. The manufacture of anhydrous metal chlorid, by treating, with chlorin gas, an oxygen-containing metal compound in a fused medium in the presence of a chlorin carrier and subsequently eliminating the chlorin carrier by fuming it off and utilizing the fume as the chlorin carrier for a further charge, substantially as hereinbefore explained.

6. The manufacture of anhydrous metal chlorid, by treating, with chlorin gas, an oxygen-containing metal compound in a fused medium, together with carbon, and admitting, after the supply of chlorin has been discontinued, dry oxygen, including dry atmospheric air, for promoting the heat for the elimination of volatile impurities from the charge, substantially as hereinbefore explained.

In testimony whereof I have signed my name to this specification, in the presence of two subscribing witnesses.

EDGAR ARTHUR ASHCROFT.

Witnesses:
GILBERT FLETCHER TYSON,
ARTHUR VICTOR STONE.